United States Patent [19]

Redmond, Jr. et al.

[11] 4,148,225
[45] Apr. 10, 1979

[54] BELT SPROCKET

[75] Inventors: John D. Redmond, Jr., Littleton; Robert P. Tone, Englewood, both of Colo.

[73] Assignee: The Gates Rubber Company, Denver, Colo.

[21] Appl. No.: 846,872

[22] Filed: Oct. 31, 1977

[51] Int. Cl.² ............................................. F16H 55/08
[52] U.S. Cl. ................................. 74/243 R; 74/457; 74/462; 74/229
[58] Field of Search .......... 74/231 R, 231 C, 231 CB, 74/243 R, 243 S, 457, 460, 462, 229; 305/13; 198/834

[56] References Cited

U.S. PATENT DOCUMENTS

| | | | |
|---|---|---|---|
| 1,026,617 | 5/1912 | Turnbull | 198/834 |
| 1,199,332 | 9/1916 | Anderson | 74/460 |
| 2,937,538 | 5/1960 | Worrall, Jr. | 198/834 |
| 2,987,932 | 6/1961 | Szann | 74/229 |
| 3,404,576 | 10/1968 | Cicognani et al. | 74/462 |
| 3,756,091 | 9/1973 | Miller | 74/231 C |
| 3,977,265 | 8/1976 | Worley et al. | 74/231 C |
| 4,007,644 | 2/1977 | Weinberger | 74/231 C |
| 4,016,772 | 4/1977 | Clemens et al. | 74/229 |
| 4,037,485 | 7/1977 | Hoback | 74/231 C |
| 4,041,789 | 8/1977 | Hoback | 74/231 C |
| 4,108,011 | 8/1978 | Gregg et al. | 74/229 |
| 4,116,081 | 9/1978 | Luttrell et al. | 74/243 R |

FOREIGN PATENT DOCUMENTS 849776  9/1960  United Kingdom ................ 74/229

*Primary Examiner*—Samuel Scott
*Assistant Examiner*—William R. Henderson
*Attorney, Agent, or Firm*—H. W. Oberg, Jr.; Raymond Fink; Curtis H. Castleman, Jr.

[57] ABSTRACT

A sprocket for use with positive drive belts of the type with oppositely facing curvilinear driving surfaces, the sprocket having improved symmetrical teeth with a cross-section profile defined by axially oriented, oppositely facing driving surface portions that extend from the top land of the tooth at an angle of about 15 degrees or less to the sprocket tooth, each driving surface of the sprocket tooth blending into an oppositely facing oblique surface at an angle of about 150 to about 170 degrees that provides a positive clearance between the sprocket tooth and side portions of a meshing belt tooth to direct egress of material away from the sprocket, the oblique surfaces define a sprocket tooth base that is wider than the sprocket tooth top land and bottom land portions between sprocket teeth providing positive clearance between the bottom land portions and belt tooth tips.

11 Claims, 3 Drawing Figures

BELT SPROCKET

BACKGROUND OF THE INVENTION

The invention relates to machine elements and mechanisms, but more particularly, the invention relates to an improved sprocket for use with positive drive belts of the integrally molded type with transversely oriented belt teeth having oppositely facing curvilinear driving surfaces.

A type of positive drive belt is disclosed in U.S. Pat. No. 3,756,091 to Miller. The belt has teeth with generally round cross sections where the driving surfaces of the teeth are defined by two circular intersecting arcs. The belt teeth mesh with a special sprocket with mating conjugate teeth. The sprocket distributes a driving load to the belt along the entire driving surfaces of the belt teeth to affect a stress distribution where the sprocket teeth are matched to a one-half order isochromatic fringe of the elastomeric belt teeth. This means that a resultant driving load vector applied to the belt teeth must be at a substantially large angle in relation to a perpendicular from the belt tensile member. Such a driving load vector distribution is discussed in U.S. Pat. No. 3,977,265 to Worley et al which is hereby incorporated by reference.

Another sprocket for use with a belt having oppositely facing curvilinear driving surfaces is disclosed in the Worley et al. patent. While the sprocket of the invention may be used with the Worley et al. type belt, the background of this invention more appropriately concerns problems associated with the Miller-type belts and sprockets.

The Miller-type sprocket is required to have a shape that is conjugate to curvilinear surfaces of teeth of a positive drive belt. The requirement that the sprocket teeth be conjugate with the belt teeth presents problems in some drive applications where foreign material may lodge between the sprocket and belt teeth. Foreign material wedged between the sprocket and belt teeth has several deleterious effects. The foreign material has the affect of changing the sprocket pitch which would cause a poor fit with the sprocket teeth which, in turn, may result in erosion of the elastomeric belt teeth. Should the foreign material be abrasive in nature, either or both the sprocket teeth and belt teeth may be eroded to the point of causing a drive system failure. Lodged foreign material has the affect of increasing sprocket diameter which could result in over tensioning the belt, or it could cause sufficient tension in the belt to overload sprocket shaft bearings to the point of their failure. A motorcycle drive is an example of a positive drive system application where either abrasive or non-abrasive foreign material may accumulate and lodge between the sprocket and belt teeth to induce the above-discussed problems. A motorcycle belt may be required to operate in an oil present environment where oil can accumulate between the sprocket and belt teeth. The presence of oil between the teeth defeats many benefits of the Miller drive. Also, abrasive particles such as dirt, sand or the like may become lodged between the belt sprocket teeth in a motorcycle drive.

Nevertheless, the Miller-type belt has many design features which offer certain advantages in some positive drive applications. The round belt teeth are suitably large to receive high sprocket loading in high torque drives. Also, a "round" tooth has sufficient depth to exhibit anti-ratcheting qualities at higher tension ratios (e.g., greater than 5:1) such as may be encountered in a fixed two-point drive which may become loosened through belt tension decay. The purpose of this invention is to provide a sprocket and a drive system adaptable for use in foreign material environments even though it is realized that when a round tooth belt is used, even loading of the belt teeth across their curvilinear driving surfaces by a conjugate sprocket is not realized.

SUMMARY OF THE INVENTION

A sprocket and a positive drive system is provided in accordance with the invention where the sprocket teeth have a shape which imparts a driving load to curvilinear belt teeth along a line that is no greater than 15 degrees to the belt tensile member. The sprocket has oppositely facing surfaces which are formed by two distinct portions. Oppositely facing driving surfaces extend from a top land of each sprocket tooth at an angle of about 15 degrees or less to the sprocket tooth axis. The driving surfaces blend into oppositely facing oblique surfaces which provide a positive clearance between the sprocket tooth and a meshing positive drive belt.

An object of the invention is to avoid the conjugate sprocket tooth and belt round tooth drive because of problems associated with foreign material lodging between the sprocket and belt teeth in some drive applications.

There are several secondary advantages associated with the sprocket and drive system of the invention:

Audible noise is reduced as clearances are provided around the belt teeth as they mesh with the sprocket.

The clearance between sprocket and belt teeth allows the egress of foreign material such as oil, dirt, water, grit or the like.

The sprocket tooth surfaces define a tooth which has a large base which is capable of handling bending moments imparted by torque drives; this permits the sprocket to be economically produced from low cost materials using low cost manufacturing techniques such as die casting.

A major advantage of the invention is that the drive system of the invention has suitable life making it highly attractive for hard drive applications such as the replacement of chains in motorcycle drives.

Another advantage of the invention is that the sprocket is suitable for use with other than round toothed belts (e.g., the belt as disclosed and described by Worley et al.

These and other objects or advantages of the invention will be realized after reviewing the drawings and description thereof wherein.

DESCRIPTION OF PREFERRED EMBODIMENTS

Figure 3:
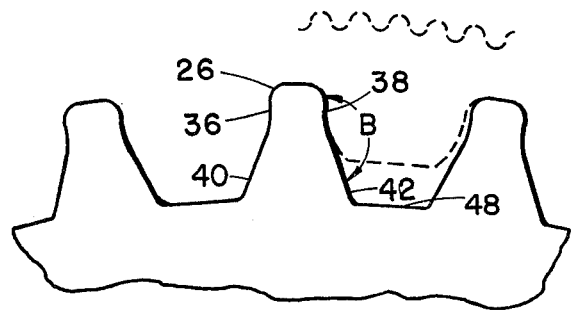
FIG. 3 is a view similar to FIG. 2 but showing an alternate form of the invention.

In accordance with the invention, a sprocket 10 with a positive drive belt 12 with teeth 14 having oppositely facing curvilinear driving surfaces 16, 18 is provided to define a positive drive system 20. The sprockets 22, 24 have a plurality of axially aligned symmetrical teeth 26 for meshing with the belt teeth. Each sprocket tooth 26 is symmetrical with an axis 28 which is radial in relation to the sprocket. Preferably, but not necesarily, the top land of a sprocket tooth has a flat portion 30 for supporting the belt. Oppositely facing driving sufaces 32, 34 extend from a tooth top land at opposite but equal angles A of about 15 degrees or less from a tooth axis. The driving surfaces are preferably substantially planar but they may optionally be slightly concave 36, 38 as shown in FIG. 3. More preferably, the driving surfaces 32, 34, 36, 38 extend at an angle A that is about 10 degrees or less from a tooth axis.

Figure 1:
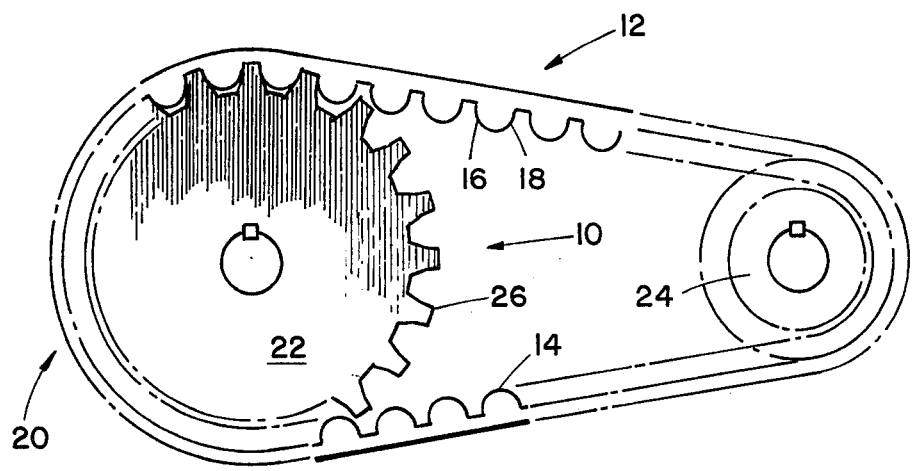
FIG. 1 is a side view of a belt drive of the invention.
Figure 2:
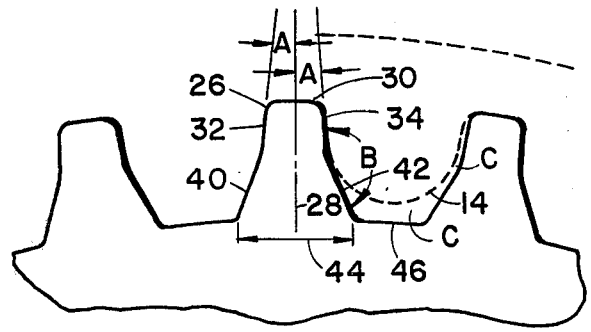
FIG. 2 is an enlarged fragmentary side view of the sprocket of the invention.

The driving surfaces of a sprocket tooth blend into oppositely facing oblique surfaces 40, 42 such that a sprocket tooth has a base 44 that is wider than its top land portion (e.g., about 2 or more times wider). The oblique surfaces are at an angle B of about 150 degrees to about 170 degrees to the driving axis and more preferably, the oblique surfaces are at an angle B of about 155 degrees to about 165 degrees to the driving surfaces. The driving surfaces of a sprocket tooth have a surface area which is from about 30 to about 60 percent of the sum of the driving surface area and the surface area of the oblique surfaces. Selection of the angle B between the driving surface and the oblique surfaces plus the selection of the surface areas allow for proper loading of a belt tooth in accordance with this invention while also providing a positive clearance C between certain portions of the sprocket and the belt teeth when a "round tooth" type belt is used (shown dotted in FIG. 2). A bottom land portion 46 between adjacent sprocket teeth is preferably substantially cylindrical (FIG. 2) or planar 48 (FIG. 3) to assure clearances between portions of the sprocket and a "round tooth" type belt.

In use, a positive drive belt having oppositely facing curvilinear driving surfaces (e.g., a round tooth belt such as disclosed by Miller or Worley) is entrained around two or more sprockets to define a belt drive system. The belt teeth are aligned transversely to the longitudinal axis of the belt and the driving surfaces extend at opposite but equal angles of 15 degrees or less to a plane normal to and transversely oriented with the belt longitudinal axis. The driving surfaces of the sprocket teeth contact the surfaces of the belt teeth near its root portion. The oblique surfaces of the sprocket teeth are at an angle such that a positive clearance is provided between the sprocket and outerside portions of the belt teeth. There is also positive clearance between the bottom land of the sprocket and the belt tooth tips. This assures that when power is transmitted between belt and sprocket, a power application will be similar to that described by Worley et al. The clearances between the belt and sprocket assures room for egress of foreign materials such as dirt or oil. The clearances also help direct egress of air from the sprocket that is compressed by a belt tooth as it meshes with a sprocket. The directional egress is particularly effective at belt speeds about 3,000 feet per minute or greater. Directional egress of air in combination with the clearances has the effect of lowering air pressure (from that of a conjugate fitting sprocket) which results in a lower drive system noise.

The combination of a round tooth belt and a sprocket of the invention defines a belt drive system where heretofore, a round tooth type belt may be unsatisfactory. For example, in primary and secondary drives for motorcycles, the round tooth belt with a conjugate sprocket was then found to be not wholly satisfactory because of problems associated with material lodging between the belt sprocket teeth. However, when a sprocket of the invention is used, clearances are provided which permit the use of a round tooth belt. Also, the anti-ratcheting qualities of the deep round tooth belt are realized where tension ratios of greater than 5 to 1 may be experienced.

A prime advantage of the invention is that the sprocket may be used with different types of belts to define satisfactory drive systems. The sprocket may be used with belts such as described in the Worley et al patent (as shown in dotted form in FIG. 3).

The foregoing detailed description is provided for purposes of illustration only and it is not intended to limit the scope of the invention which is to be determined by the appended claims.

What is claimed is:

1. A sprocket having circumferentially spaced teeth that are axially aligned, the sprocket for use with positive drive belts of the type having teeth with oppositely facing curvilinear driving surfaces that convergingly extend from the roots of each belt tooth at opposite equal angles of about 15 degrees or less from a plane transversely normal to the longitudinal axis of the belt, wherein improvement in the sprocket comprises:

symmetrical sprocket teeth with each tooth having an axis, a tooth top land and an axial cross-section profile formed by oppositely facing driving surface portions for contacting portions of the belt on the belt teeth near the belt teeth roots, the driving surfaces of a sprocket tooth extending from the top land at an angle of about 15 degrees or less to the sprocket tooth axis, each driving surface of the sprocket tooth blending into an oppositely facing oblique surface at an angle of about 150 to about 170 degrees that provides a positive clearance between the sprocket tooth and side portions of a meshing belt tooth to direct egress of material away from the sprocket, the oblique surfaces define a sprocket tooth base that is wider than the sprocket tooth top land and bottom land portions between sprocket teeth providing positive clearance between the bottom land portions and belt tooth tips.

2. The sprocket as claimed in claim 1 wherein the driving surfaces of the sprocket teeth are planar.

3. The sprocket as claimed in claim 1 wherein the driving surfaces of the sprocket teeth are substantially concave.

4. Th sprocket as claimed in claim 1 wherein the oblique surfaces of the sprocket teeth are substantially planar.

5. The sprocket as claimed in claim 1 wherein the bottom lands between sprocket teeth are substantially planar.

6. The sprocket as claimed in claim 1 wherein the driving surfaces of the sprocket teeth extend at an angle of about 10 degrees or less to the sprocket teeth axis.

7. The sprocket as claimed in claim 1 wherein the driving surfaces of the sprocket teeth are substantially planar, the oblique surfaces of the sprocket teeth are substantially planar, and the lands between sprocket teeth are substantially planar.

8. The sprocket as claimed in claim 1 wherein the driving surfaces of a sprocket tooth have an area and the oblique surfaces of a sprocket tooth have an area, and wherein the area of the driving surfaces are from about 30 to about 60 percent of the sum of the driving surface and oblique surface areas.

9. The sprocket as claimed in claim 8 wherein the driving surface area about equals the oblique surface area; the driving surfaces are at equal but opposite angles of about 9 degrees to the sprocket teeth axis.

10. The sprocket as claimed in claim 1 wherein the sprocket teeth have a top land with a generally flat portion.

11. A positive drive system comprising at least two sprockets, each having the characteristics as claimed in claim 1, and a toothed positive drive belt entrained by the sprockets and having oppositely facing curvilinear tooth driving surfaces that extend at opposite equal angles of about 15 degrees or less to a plane oriented transversely of and normal to a longitudinal axis of the belt.

* * * * *